US006113726A

United States Patent [19]

Leschot

[11] Patent Number: 6,113,726

[45] Date of Patent: Sep. 5, 2000

[54] METHOD OF MOULDING AND APPLYING MARKS ON A SURFACE

[75] Inventor: Georges-Andre Leschot, Commugny, Switzerland

[73] Assignee: Promatec Systems S.A., Switzerland

[21] Appl. No.: 09/029,473

[22] PCT Filed: Aug. 23, 1996

[86] PCT No.: PCT/CH96/00292

§ 371 Date: May 22, 1998

§ 102(e) Date: May 22, 1998

[87] PCT Pub. No.: WO97/08592

PCT Pub. Date: Mar. 6, 1997

[30] Foreign Application Priority Data

Aug. 28, 1995 [CH] Switzerland ............................ 2452/95

[51] Int. Cl.[7] .............................. B32B 31/20; B28B 1/14; B28B 13/04; G04B 19/10

[52] U.S. Cl. .......................... 156/232; 156/245; 156/285; 156/500; 425/175; 425/440; 264/225; 264/316; 368/226; 368/232; 968/153; 968/156; 968/215

[58] Field of Search .................................... 156/232, 238, 156/241, 245, 277, 285, 387, 500, 578, 583.3; 264/132, 225, 259, 316, 328.1, 331.11; 425/175, 542, 543, 436 R, 437, 440; 368/226, 228, 232; 968/153, 156, 213, 215, 712

[56] References Cited

U.S. PATENT DOCUMENTS

| | | | |
|---|---|---|---|
| 1,607,822 | 11/1926 | Granger | 968/215 |
| 3,197,846 | 8/1965 | Vogt | 968/153 |
| 3,351,510 | 11/1967 | Harris | 156/232 |

FOREIGN PATENT DOCUMENTS

| | | |
|---|---|---|
| 0282606 | 9/1988 | European Pat. Off. . |
| 334706 | 1/1959 | Switzerland . |
| 395870 | 7/1964 | Switzerland . |
| 392395 | 1/1965 | Switzerland . |
| 410793 | 12/1965 | Switzerland . |

*Primary Examiner*—Michael W. Ball
*Assistant Examiner*—Michael A Tolin
*Attorney, Agent, or Firm*—Ostrolenk, Faber, Gerb & Soffen, LLP

[57] ABSTRACT

A method by which an elastomer is applied to a model (1) with relief marks to be reproduced. The purpose of the elastomer once set is to form a mold membrane (14) and incorporate within its own material the shape of the marks on the model. The mold membrane is then separated from the model and filled with a setting material, and the mold membrane is applied to a support in order to transfer the marks after preliminary pasting.

14 Claims, 3 Drawing Sheets

METHOD OF MOULDING AND APPLYING MARKS ON A SURFACE

FIELD OF THE INVENTION

The present invention relates to the field of fixing elements to supports and relates more particularly to a process for molding and applying three-dimensional indications to a surface such as a timepiece dial which acts as a support.

BACKGROUND OF THE INVENTION

Processes for fixing elements to supports, such as the processes of transfer printing by means of an etched block and a pad, have been known for a long time and give very good results when the indications to be reproduced are flat and thin, but these processes becomes [sic] more difficult to use when it is desired to obtain more substantial thicknesses. Other techniques such as insertion or adhesive coating have hitherto enabled three-dimensional indications to be fixed by placing them individually.

Other processes exist in which the indications to be affixed, for example to a dial, are produced by cutting a sheet consisting of a compound possibly containing luminescent material, the indications obtained having a flat shape. However, this process, on the one hand, does not allow the production of indications of elaborate shape and, on the other hand, presupposes a manipulation carried out by an operator in order to place them on the support.

SUMMARY OF THE INVENTION

The present invention aims to overcome all these drawbacks and more particularly to allow the creation of indications of any shape and/or thickness, while eliminating the manipulation of the indications by an operator during the procedure of laying them on the support. The process for transferring indications to a surface according to the invention is characterized in that an elastomer is applied to a pattern having at least one indication in relief to be reproduced, this elastomer, after having cured, being intended to form a membrane-mold and to reproduce in negative the indication in relief on the pattern, in that the membrane-mold is separated from the pattern, in that the membrane-mold is filled with a compound capable of curing and in that the membrane-mold containing the indication filled with the cured compound, or the compound in the process of curing, is applied to a support so as to transfer the indication after having precoated the place or the visible surface of the indication with adhesive.

The invention also relates to a tool for implementing this process, characterized in that it comprises a retaining piece having at least one orifice, the piece having at least one indexing notch or perforation, molding pieces gripping the retaining piece and the pattern for producing the membrane-mold by molding.

The subject of the invention is also the support obtained by implementing the process.

BRIEF DESCRIPTION OF THE DRAWINGS

The appended drawing shows, by way of non-limiting examples, an embodiment and variants of the process according to the invention.

DETAILED DESCRIPTION OF THE INVENTION

Figure 1:
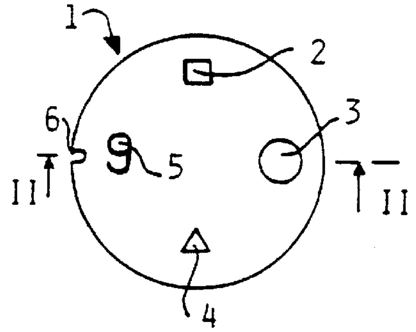
FIG. 1 shows a top view of an initial pattern for a dial, comprising indications in relief which it is desired to reproduce and affix to a surface, the initial pattern being in the form of a disk with an indexing notch.

The pattern in FIG. 1 is a dial pattern for a timepiece having three-dimensional indications exhibiting a certain relief. The standard dial in FIG. 1 represents a definitive pattern which will serve to produce the tooling devices and the molds used for the mass manufacture of timepieces to be reproduced. It comprises a disk 1 on which the indications 2–5 to be molded are produced either by machining or by bonding or welding to the surface. The pattern serves as a die for a first operation of molding and positioning the indications on surfaces representing the blank for the dials to be manufactured.

Although the pattern shown is a timepiece, it is obvious that the process which will be described below is not limited to this application and that it may be applied to the production of dials or any surface bearing three-dimensional indications used in mechanical engineering, electronics, etc.

The initial pattern shown in FIG. 1 is in the form of a disk 1, the surface of which has various indications 2, 3, 4, 5 which may have varied three-dimensional shapes. This pattern will be used for producing one or more molds which will make it possible to manufacture and contain the indications in accordance with the original. The indications contained in the molds may then be fixed to a support in a single operation. The edge of the disk 1 furthermore has an indexing notch 6.

Figure 2:
FIG. 2 is a cross section on the line II—II of the pattern in FIG. 1.
Figure 3:
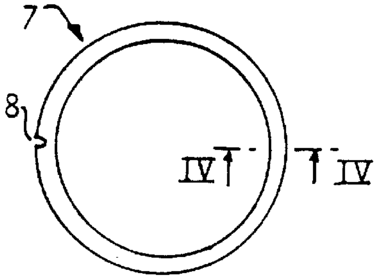
FIG. 3 represents a ring having the same external dimension as the pattern in FIG. 1, also with an indexing notch.
Figure 4:
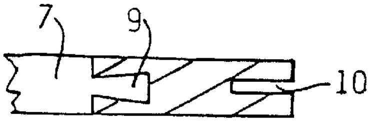
FIG. 4 is a cross section on the line IV—IV of the ring in FIG. 3, on an enlarged scale, in which may be seen a rectangular channel on the outside and a dovetail machined cut on the inside.

With the pattern in FIGS. 1 and 2, the first operation carried out is the manufacture of at least one membrane-mold. In order to support this membrane-mold, a ring 7, shown in FIGS. 3 and 4 and provided with an indexing notch 8 corresponding to the notch 6 in the disk 1, is advantageously used. The ring 7 is machined with a dovetail internal profile 9 so as to be able to retain the membrane.

Figure 5:
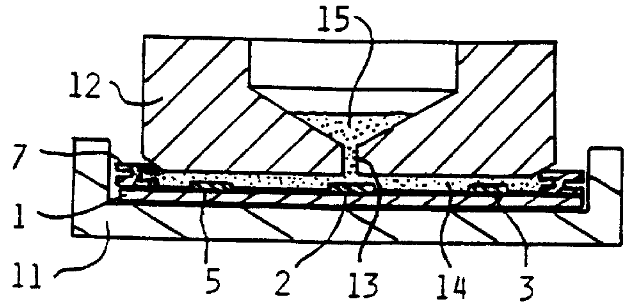
FIG. 5 shows a device for producing a membrane-mold intended to reproduce the indications in relief.

The disk 1 and the ring 7 are placed freely, without any clearance, as shown in FIG. 5, inside a molding device or die 11, the disk 1 and the ring 7 being placed in superposition, making the indexing notch 6 in the disk 1 coincide with the indexing notch 8 in the ring 7.

Placed on this assembly is a cover 12 having the general shape of a funnel opening onto a central orifice 13 intended for passage of a silicone compound 15 poured onto the assembly. Since the base of the cover is substantially planar, the excess silicone 15 in the funnel of the cover 12 can be recovered. The substance 15 employed in this case is a two-part silicone elastomer whose most important characteristics are its elasticity, its mechanical strength and chemical resistance, its low shrinkage and excellent temperature withstand behavior. Other substances with similar properties may be used.

Figure 6:
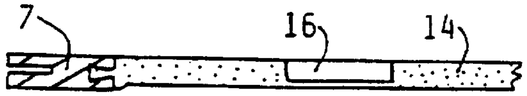
FIG. 6 details the connection between the membrane-mold and the ring.

In this way, a membrane-mold 14 having an elastic character is obtained, this membrane-mold 14 being supported by ring 7, as shown in FIG. 6. The membrane-mold 14 has hollow regions 16 formed, during molding, by the three-dimensional indications 2 to 5. This operation may be repeated several times so as to cast the desired number of membrane-molds 14 intended for the production run.

Figure 7:
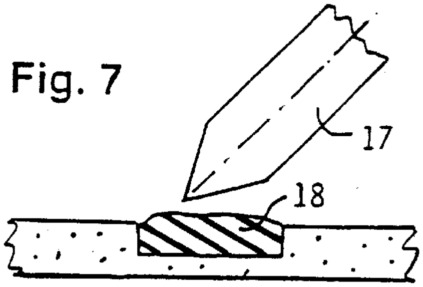
FIG. 7 shows one way of manually filling the mold using a filling nozzle.
Figure 8:
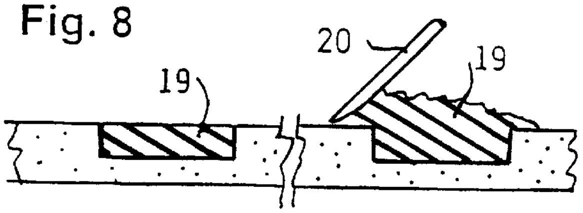
FIG. 8 gives another alternative way of filling, by deposition and scraping of the upper surface of the mold with a blade.

The next step in the process corresponds to filling the membrane-mold shown in FIG. 6. There are several possibilities. In one preferred alternative, illustrated in FIG. 7, one may opt for a system of filling using a metering apparatus having a nozzle 17 for dispensing a filling compound 18, this system being either manual or controlled by a numerical-control machine, not shown. In another variant, the filling may be accomplished by pouring a suitable amount of filling compound 19 (FIG. 8) and subsequently razing the surface using a doctor blade 20 intended to remove the excess material. Another alternative would be to carry out the operation by means of a vibrating action, not shown.

Figure 9:
FIG. 9 represents said membrane-mold filled with the molded compounds.

FIG. 9 shows a membrane-mold 14 held in the ring, the hollow regions 16 being filled with the filling compounds 18 or 19.

The filling compound 18 or 19 is, in a preferred case, composed of a transparent lacquer with which has been premixed with a luminescent or pigmented powder which polymerizes in a few seconds under ultraviolet radiation. Acrylic resins or other resins drying in air or in an oven may also be used. The luminescent powders may be based on tritium-treated zinc sulfite and sulfate, allowing the indications on the dial to be seen at night.

Other alternative filling substances should be considered in order to vary the colors or to obtain other desired effects.

The molded compounds 18 or 19, depending on their nature, are cured by various processes: ultraviolet radiation, oven treatment, ambient air, etc. As mentioned above, one or more membrane-molds are necessary for the production run, depending on the ratio between the time for the molded compounds to cure and the time for applying these compounds on the dial.

Figure 10:
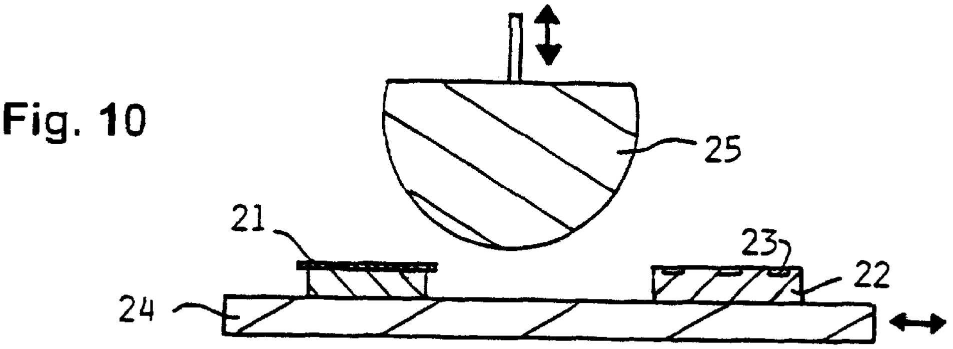
FIG. 10 represents a device used for transfer printing and coating the surface intended to receive the molded compounds with adhesive, using an inverted block, a pad and a sliding support.

The next phase, illustrated in FIG. 10, consists in applying the cured molded compounds to the surface 21 intended to receive them. To do this, said surface or the indications must be precoated with adhesive, either manually using a metering device or using a metering dispenser mounted on a numerical-control machine or by a transfer printing system, which process is well known in the manufacture of watch dials. In the latter case, a metal block 22 is used which has the indications 23 to be bonded etched on its surface to a slightly smaller size. This etching operation could be performed by covering the original block 22 with a photosensitive film (photographic printing technique) and thereafter treating the unmasked parts with acid. Once the block 22 has been fixed to its movable frame 24, it is coated with adhesive and, after scraping with a spatula, the impression is taken using a gelatin or silicone pad 25. The adhesive is deposited on the surface 21 to be coated (dial or indication) using said pad 25. The movable frame 24, and likewise the pad 25, is controlled by a device, not shown, having, for example, translation sideways and limit stops allowing relative positioning of the surface 21 with respect to the block 22 (FIG. 10).

Figure 11:
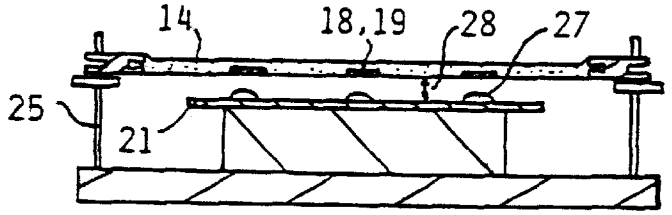
FIG. 11 shows the relative positioning of the surface precoated with adhesive and the membrane-mold containing the molded compounds before the operation of placing the compounds using a positioning tool.

As illustrated in FIG. 11, the membrane-mold 14 is accurately placed, by means of an indexing device 26, on the surface 21 having spots of adhesive 27, leaving a suitable heightwise clearance 28.

Figure 12:
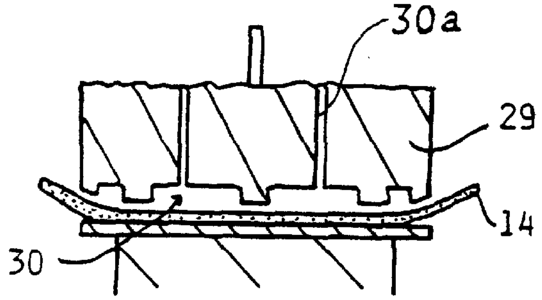
FIG. 12 shows the contacting of the compounds with the surface using an application tool.
Figure 13:
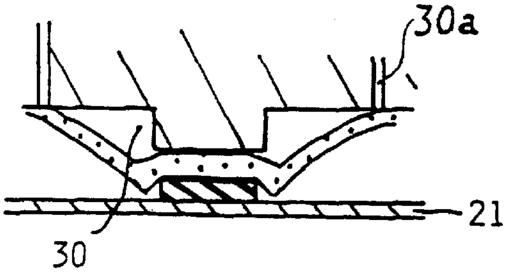
FIG. 13 illustrates the deformation of the membrane-mold, allowing transfer of a molded compound, with application of a vacuum using a tool.

The membrane-mold 14 is pressed against the adhesive-coated surface of the support 21 using an application tool 29, shown diagrammatically in FIG. 12 and 13, and the molded indications 18, 19 are released via the edges of the membrane by creating, by means of the ducts 30*a*, a vacuum in the suction chambers 30 provided in the tool 29. Advantageously, the tool 29 may also be produced from the molding die in FIG. 1 according to the following operations:

a) use of a membrane-mold 14 such as the one produced and described with regard to FIG. 6, the membrane-mold 14 being placed in the die shown in FIG. 5, after having been turned it upside down;

b) filling the hollow regions 16 of the membrane-mold 14 using a nonelastic material capable of curing, for example polyurethane or polyester resin, or else an epoxy;

c) the cured compounds are recovered on a doublesided rigid self-adhesive tape and then transferred by bonding, still using the die shown in FIG. 5, to a support disk which will itself be used as the application tool 29 after having been pierced so as to render the suction chambers 30 operational.

This manner of operating has the advantage of producing all the tools precisely, starting from the pattern in FIG. 1 and using the die in FIG. 5. Thus, all the molding, positioning and transfer operations are carried out with the same die, starting from the initial pattern in FIG. 1.

The membrane-mold 14 is extracted by means of the suction chambers 30 and the molded indications 18, 19 are applied at the desired point. Thereafter, the membrane-mold 14 is released from the application tool 29 and may be filled again.

Figure 14:
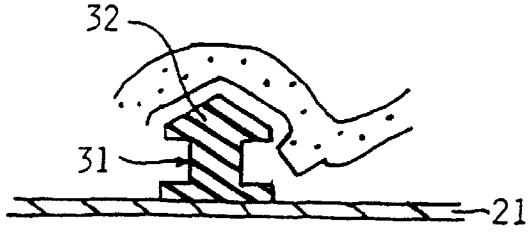
FIG. 14 shows the transfer of a molded compound having a shape with concave parts.

FIG. 14 shows an enlarged scale of a molded indication 32 which is particularly high and also has a lateral recess 31 allowed by the process described up to now.

The process which has just been described has the following advantages:

the indications are no longer touched during the production of a piece, this being particularly advantageous when using radioactive indications;

the precision is uniform during molding and transfer, the indications being positioned once and for all during an initial adjustment and all the operations being carried out using the membrane-mold and the die in FIG. 5;

compared to the processes of the prior art, there is a considerable saving in time, given that the work may be carried out in mass production using several membrane-molds, all produced with the same initial pattern.

In order to transfer indications continuously, the process described with regard to FIGS. 1 to 14 requires the production of 4 to 8 membrane-molds according to FIGS. 3 to 6. Thus, the various stations allowing membrane-mold filling, drying, adhesive coating and placing of indications on a support, may be provided.

Figure 15:
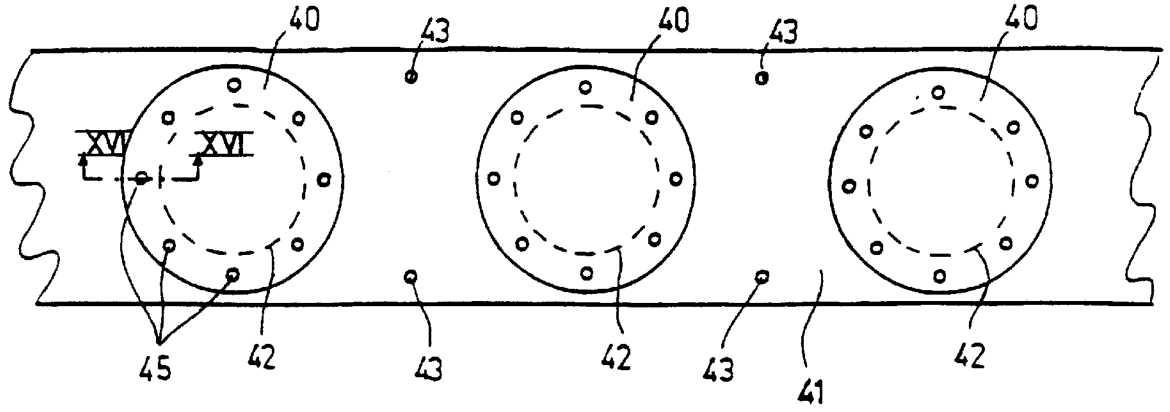
FIG. 15 represents a succession of membrane-molds injected over holes made on a flexible support in the form of a tape.
Figure 16:
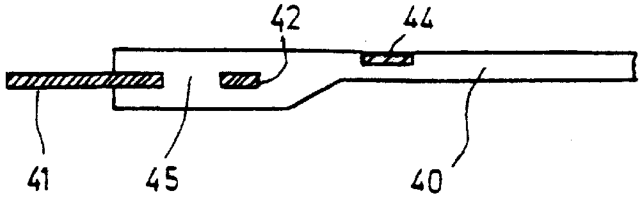
FIG. 16 is a section through a membrane-mold of the support on the line XVI—XVI in FIG. 15.
Figure 17:
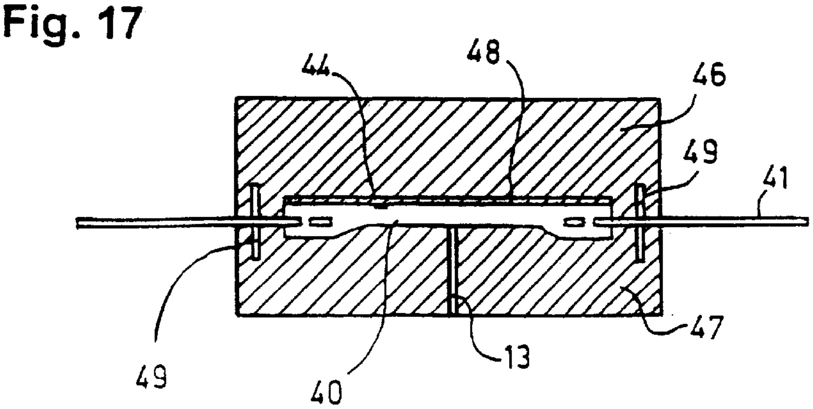
FIG. 17 is a section through an injection device gripping the tape of the support in FIG. 15 and allowing the succession of membrane-molds to be produced continuously.

In the variant of the process described with regard to FIGS. 15 to 17, the membrane-molds 40 are produced continuously on a flexible support which is in the form of a tape 41 having holes 42 over which said membrane-molds 40 will be injected. The support 41 has, between the holes 42, perforations 43 which will serve to position the tape 41 during the various operations of producing the membrane-molds 40, filling said membrane-molds and placing the indications 44 (FIG. 16) on a support, not shown. In order to fasten the tape 41 to the membrane-molds 40 and avoid any relative displacement between the two components (tape 41 and membrane-molds 40), anchoring perforations 45 placed around the holes 42 are provided on the tape 41. Thus, during production of the membrane-molds 40 by injection molding, as shown in FIG. 17, the material injected between two jaws 46 and 47 of the molding device gripping the tape 41 will enter the perforations 45 and fasten each membrane-mold to the tape 41. The molding device in FIG. 17 is similar to that described with regard to FIG. 5, with its cover or top 12 (FIG. 5) containing the initial pattern or disk 48 corresponding to the pattern 1 in FIG. 1. The lower jaw 47 includes a central orifice 13 intended for passage of the silicone compound which is injected and which, after having cured, is intended to form the membrane-molds 40. The jaws 46, 47 of the molding device in FIG. 17 are positioned using a guide punch 49 which enters the perforations 43 for positioning the tape 41.

As described above with regard to FIGS. 4 to 6, the material used for producing the membrane-molds is a two-part silicone injected cold into the jaws 46, 47 of the preheated mold. Placed at the bottom of one of the jaws 46, 47 will be a disk, not shown, similar to that in FIG. 1 having the indications to be impregnated in the membrane-mold. As a variant, the indications to be impregnated in the membrane-mold may be formed on the bottom of one of the jaws 46, 47. The support used is a flexible support in the form of a polyester or polycarbonate tape. The tape 41 with its membrane-molds obtained by overmolding is, after the membrane-molds have cured, used for passing on to the phase of filling the indications, as shown in FIGS. 6 to 9, and then to the phase of adhesive coating and of transferring the indications to a support. The variant which has just been described has the advantage whereby the various phases of overmolding the membrane-molds, filling the indications, adhesive coating and transferring said indications may be carried out separately or continuously. The tapes containing the indications may also be stored and the tapes may be used in a lost-mold process or be reused after the indications which they contained have been transferred.

The process which has just been described has the following advantages:

1. Control of the drying time during mold-membrane production and control of the drying time during indication filling.
2. Manipulations by an operator, for example if the indications are radioactive, are avoided. Possibility of storing the tapes containing or not containing the indications.
3. No wear—the tapes are simply thrown away after they have been used one or more times. Guarantee of quality and precision.
4. The process may be completely automated and used continuously or in separate phases (drying, filling, etc.).

Finally, the process which has just been described offers the possibility, if desired, of placing inserts in the indications or of producing multilayer indications.

What is claimed is:

1. A process for transferring indications to a surface, the process comprising the steps of:

applying an elastomer to a pattern having at least one indication in relief to be reproduced;

curing the elastomer to form a membrane-mold thereby reproducing, in negatives, the at least one indication in the membrane-mold;

separating the membrane-mold from the pattern;

filling the membrane-mold with a compound capable of curing, the compound forming a reproduction of the at least one indication;

coating at least one of the surface and the reproduction of the at least one indication with an adhesive;

applying the membrane-mold containing the reproduction of the at least one indication to the surface so as to transfer the reproduction of the at least one indication to the surface.

2. The process as claimed in claim 1, wherein the membrane-mold is produced so that the thickness of its layer may contain three-dimensional indications exhibiting a considerable relief.

3. The process as claimed in claim 1, wherein an application tool is produced for transferring the indications having parts in relief corresponding to the shape of the indications to be transferred and hollow parts surrounding the parts in relief, the parts in relief bearing on the membrane-mold at the place of the indications and the hollow parts being connected to orifices allowing a vacuum to be created between the membrane-mold and the hollow parts in order to press the membrane-mold against said hollow parts and thus disengage the periphery of the indications.

4. The process as claimed in claim 1, wherein the elastomer of the membrane-mold is a two-part silicone elastomer.

5. The process as claimed in claim 1, further comprising the step of positioning the membrane-mold above the surface prior to transferring the reproduction of the at least one indication from the membrane-mold to the surface.

6. The process as claimed in claim 1, wherein several membrane-molds are produced, these being intended to be used continuously in the phases of membrane manufacture, filling and transfer of the indications.

7. The process as claimed in claim 6, wherein the membrane-mold is overmolded over an orifice provided in a retaining piece, the piece having indexing notches or perforations.

8. The process as claimed in claim 7, wherein the retaining piece is in the form of a plastic tape provided with a succession of orifices, a membrane-mold being overmolded over each orifice.

9. A tool for producing a membrane-mold containing a negative mold of indications formed on a pattern support, the tool comprising:

a retaining piece having at least one orifice, the piece having at least one indexing notch or perforation;

a first molding piece gripping the retaining piece and the pattern support; and a second molding piece disposed above the first molding piece and containing an elastomer, wherein the second molding piece delivers the elastomer to the pattern support and the orifice of the retaining piece thereby producing the membrane-mold containing the negative mold of the indications.

10. The tool as claimed in claim 9, wherein the retaining piece is a ring (7) having a dovetail internal profile (9) intended to retain the membrane-mold, the ring including an indexing notch (8) allowing it to be positioned relative to the pattern or to the support.

11. The tool as claimed in claim 9 wherein the retaining piece is a tape (41) having a succession of orifices (42) over each of which a membrane-mold (40) is overmolded, the tape having indexing perforations (43).

12. The tool as claimed in claim 9, wherein the negative mold in the membrane-mold is filled with a compound thereby forming reproductions of the indications, the tool further comprising:

a suction tool having parts in relief which correspond to the shape and to the place of the reproduction indications contained in the membrane-mold, the parts in relief being surrounded by suction chamber (30), the suction tool being placed on the membrane-mold.

13. The tool as claimed in claim 12, wherein the suction tool (29) is produced from the membrane-mold.

14. A process for transferring indications to a surface, the process comprising the steps of:

applying an elastomer to a pattern wherein the pattern has a set of indications in relief to be reproduced;

curing the elastomer to form a membrane-mold thereby reproducing, in negative, the indications in the membrane-mold;

separating the membrane-mold from the pattern;

filling the membrane-mold with a compound capable of curing, the compound forming a reproduction of the indications;

coating at least one of the surface and the reproduction of the indications with an adhesive;

after the coating, applying the membrane-mold containing the reproduction of the indications to the surface in an automated operation so as to transfer the reproduction of the indications to the surface.

* * * * *